United States Patent [19]

Kazan et al.

[11] 4,330,370

[45] May 18, 1982

[54] SEAL AND BEARING ARRANGEMENT FOR USE IN A NUCLEAR REACTOR

[75] Inventors: Joseph M. Kazan, New Stanton; John E. Sharbaugh, Acme; William C. Ritz, Greensburg, all of Pa.

[73] Assignee: Electric Power Research Institute, Palo Alto, Calif.

[21] Appl. No.: 49,453

[22] Filed: Jun. 18, 1979

[51] Int. Cl.³ .............................................. G21C 17/20
[52] U.S. Cl. ................................................. 376/200
[58] Field of Search ............................. 176/37, 38, 87

[56] References Cited

U.S. PATENT DOCUMENTS

| 4,050,987 | 9/1977 | Wade | 176/87 |
| 4,080,254 | 3/1978 | Poindexter | 176/38 X |
| 4,081,322 | 3/1978 | Aubert et al. | 176/37 |
| 4,116,766 | 9/1978 | Poindexter et al. | 176/38 |
| 4,135,973 | 1/1979 | Golden | 176/38 X |
| 4,181,572 | 1/1980 | Wade | 176/87 |
| 4,192,558 | 3/1980 | Wade | 176/87 X |
| 4,230,526 | 10/1980 | Briggs et al. | 176/38 |

FOREIGN PATENT DOCUMENTS 2730014  2/1978  Fed. Rep. of Germany ........ 176/87

Primary Examiner—Peter A. Nelson
Attorney, Agent, or Firm—Flehr, Hohbach, Test et al.

[57] ABSTRACT

A combination seal and bearing arrangement for use in a nuclear reactor including a vessel and vessel cover is disclosed herein. The vessel cover itself includes at least one rotatable plug which serves to perform certain position related functions within the reactor vessel and the combination seal and bearing arrangement is provided for sealing the annular opening around the rotation plug while, at the same time, providing a bearing support for the latter.

11 Claims, 3 Drawing Figures

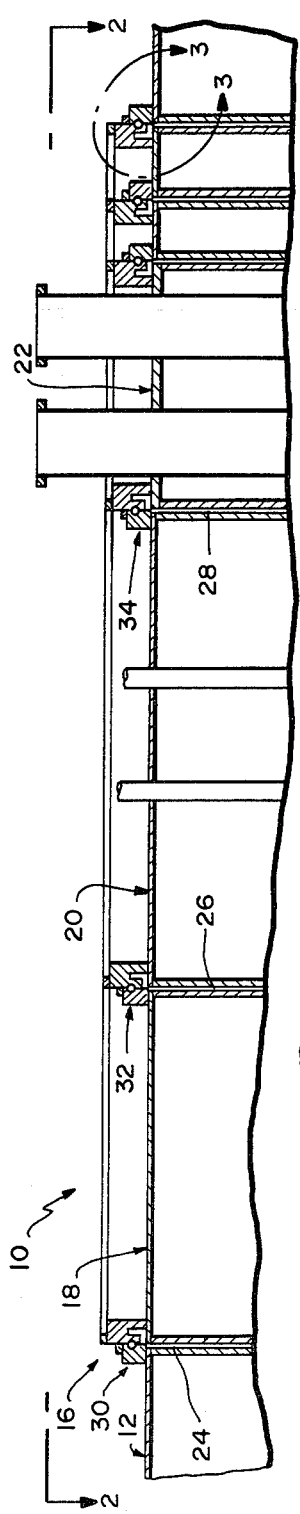
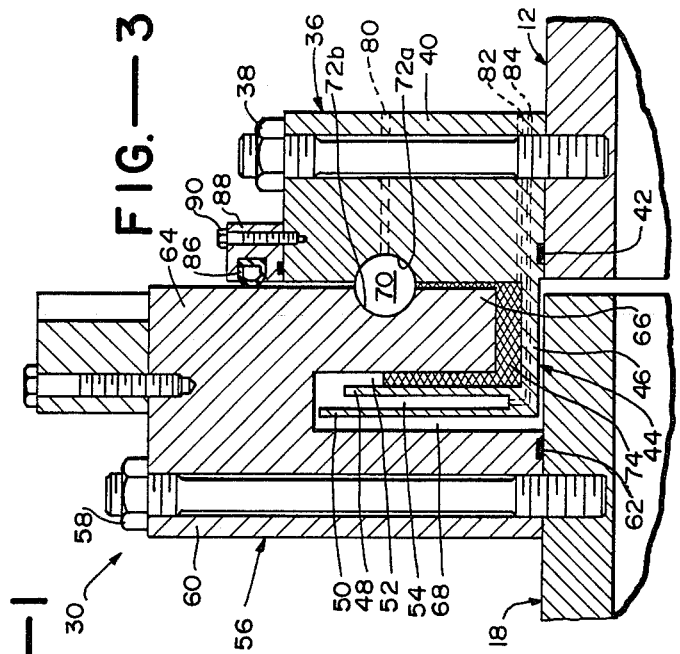
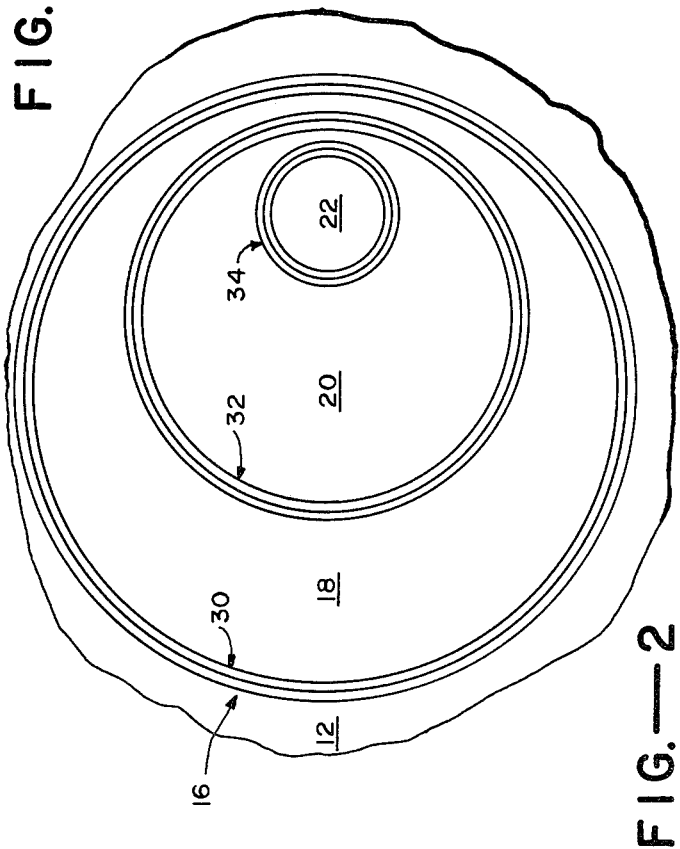

SEAL AND BEARING ARRANGEMENT FOR USE IN A NUCLEAR REACTOR

The present invention relates generally to nuclear reactors of the type including a reactor vessel having a vessel cover which utilizes at least one rotatable plug for performing certain position related functions within the vessel. The present invention relates more particularly to a combination seal and bearing arrangement for use with this nuclear reactor and specifically for use with its vessel cover.

An example of the nuclear reactor just recited, at least with respect to its rotating plugs and internal components may be seen in co-pending United States patent application, Ser. No. 13,420, filed Feb. 21, 1979 and entitled A CABLE HANDLING SYSTEM FOR USE IN A NUCLEAR REACTOR, said application having been assigned to the Assignee of the present application. As seen there, the cover of the reactor vessel includes a horizontally extending deck containing a plug assembly made up of three horizontally extending, circular plugs, an outermost plug which is the largest of the three, an intermediate plug which is eccentrically located entirely within the outermost plug and an innermost plug which is eccentrically located entirely within the intermediate plug. These plugs serve to perform certain position related functions within the reactor vessel, specifically to facilitate refueling of the reactor core by rotating the plugs relative to one another and to the stationary deck.

Each of the rotating plugs just described and its surrounding plug or the stationary deck in the case of the outer plug define an annular opening or clearance gap therebetween. This gap should contain some sort of bearing system to facilitate rotation of the plug and some sort of sealing system for containment of the reactor core coolant and cover gas within the reactor vessel while preventing an influx of oxygen, water vapor or other ambient materials into the reactor vessel. Heretofore, this has been typically accomplished by means of an arrangement typically including what is commonly referred to as a dipseal, a separate annular backup seal and a system of bearings. In this arrangement, the dipseal is comprised of means located on opposite sides of the annular clearance gap for containing a pool of liquid metal sealant, usually liquid sodium where the latter is used as the reactor coolant. The system of bearings is located externally of the liquid sealant and the backup seal is disposed between the two. This backup seal is typically constructed of an inflatable and deflatable elastomer which is maintained in its inflated state during normal operation of the reactor for providing a tight seal in order to prevent reactor cover gas pressure surges from forcing the liquid sodium sealant up into the bearing system. When the cover plugs are rotated the backup seal is partially deflated, sufficient to allow rotation of the plug but nevertheless remaining in sealing engagement.

There are a number of drawbacks associated with the arrangement just described. First, with respect to the dipseal, while the use of sodium as a sealant has the advantage of being compatible with sodium in the reactor vessel, it causes oxidation of the surrounding components and particularly the bearing system which is very difficult to clean. Other compatible liquid metal sealants which have been suggested include mercury and an alloy of tin and bismuth. However, this latter alloy also results in a severe oxidation problem and the mercury results in toxicity problems. As will be seen hereinafter, in accordance with one preferred aspect of the present invention, a non-metallic liquid sealant is used in place of the liquid metal sealant and does not provide an oxidation or toxicity problem. While this non-metallic sealant is not compatible with the reactor coolant, it is reliably isolated from the latter, as will also be seen hereinafter.

A second drawback associated with the prior art arrangement described above resides in the utilization of its backup, elastomeric seal between the pool of liquid metal sealant and the bearing system. More specifically, during normal operation of the sealant over extended periods of time, it is necessary to periodically replace the elastomeric seal due to wear. Because of its positional relationship to the bearing system, it is necessary to disassemble the latter in order to make this change which may be complicated and, in any event, time consuming. However, since this seal at least in part serves to protect the bearing system from the liquid metal sealant, it must be positioned inwardly of the latter. On the other hand, the liquid sealant utilized by the present invention is one which is compatible with its associated bearing system and, in fact, serves as a lubricant for the latter. Hence, the bearing system is positioned in direct contact with the latter, thereby eliminating the need for an inflatable elastomeric seal therebetween. However, an inflatable and deflatable elastomeric seal is nevertheless used, but it is located externally of the bearing system and, hence, can be easily replaced without disassembling the latter. Moreover, since the elastomeric seal does not serve to protect the bearing system from internal cover gases or from the liquid sealant itself, it does not have to remain in engagement at all during rotation of its associated plug and will therefore last longer than the previous elastomeric seals that remained in engagement with their plugs during rotation.

In view of the foregoing, one object of the present invention is to provide a combination arrangement for providing a seal and bearing system within the annular clearance around a rotating plug in a nuclear reactor of the type described and particularly to an arrangement which is uncomplicated in design, relatively economical to provide and, most important, reliable in use.

Another object of the present invention is to provide a combination seal and bearing arrangement which in a preferred embodiment utilizes a non-metallic sealant for sealing the previously mentioned clearance gap and, in any event, a sealant which is compatible with the bearing system used, thereby eliminating the need for an inflatable elastomeric seal therebetween.

Still another object of the present invention is to minimize the possibility of any of the sealant reaching the liquid metal coolant within the reactor vessel in the unlikely event that a seismic occurrence might cause the liquid sealant to splash.

Yet another object of the present invention is to select a liquid sealant which also serves as a lubricant for its bearing system.

Still another object of the present invention is to provide the combination sealing and lubricating fluid just mentioned and to periodically replace it with clean fluid without disassembling any of the components making up the overall seal and bearing arrangement or any other components of the reactor.

Still another object of the present invention is to provide a combination seal and bearing arrangement which includes an inflatable elastomeric seal, but one which is easily accessible from the ambient surroundings for replacement and one which does not need to be placed in engagement during rotation of its associated plug, thereby increasing its useful life.

As will be discussed in more detail hereinafter, the overall combination seal and bearing arrangement meeting the foregoing objectives is one which includes stationary means fixedly mounted around the outside of the annular clearance gap which extends around the particular plug to be sealed and supported for rotation. This combination arrangement also includes rotating means fixedly mounted to the plug itself for rotation therewith and extending around the inside of the annular clearance gap. This rotating means and the stationary means just mentioned together define a circumferential leakage path therebetween, which path extends outwardly from the annular clearance gap to the ambient surroundings. In accordance with the present invention, the overall arrangement disclosed herein is provided with bearing means located between and engaging both the stationary and rotating mens inside the annulus path just described and sealing and lubricating fluid, specifically, a liquid, filling an entire circumferential section of the leakage path between the bearing means and annular clearance gap. This fluid is provided for sealing the leakage path while, at the same time, lubricating the bearing means.

In accordance with another aspect of the present invention, the combination seal and bearing arangement constructed in accordance with a preferred embodiment includes means for easily providing and replacing the sealing and lubricating fluid without disassembling the arrangement and means for minimizing the possibility that this fluid will reach the liquid metal coolant within the reactor in the unlikely event that a seismic occurrence might cause the fluid to splash. Still another aspect of the present invention resides in the utilization of an inflatable and deflatable seal means which does not have to remain in a seal engaged position during rotation of the plugs and which is located externally of the arrangement's bearing means for easy replacement without the necessity of disassembling the latter.

FIG. 1 is an elevational view, primarily in section, of parts of a nuclear reactor of the general type described previously, but one including a combination seal and bearing arrangement which is associated with each rotating plug and which is designed in accordance with the present invention.

FIG. 2 is a diagrammatic illustration in plan view illustrating the rotating plugs and associated seal and bearing arrangements comprising part of the reactor of FIG. 1.

FIG. 3 is an enlarged vertical sectional view illustrating one of the combination seal and bearing arrangements of FIGS. 1 and 2 in cross-section.

Turning now to the drawings, wherein like components are designated by like reference numerals throughout the various figures, attention is specifically directed to FIG. 1 which illustrates in part a liquid metal fast breeder reactor 10 of the pool type, although the reactor could also be of the loop type or any other type compatible with the present invention. This reactor is shown including a horizontally extending deck or cover 12 directly above a vertically depending reactor vessel (not shown). The reactor includes a number of internal components, that is, components located within the vessel 24 including those discussed or generally mentioned in the above recited co-pending patent application. As stated there, these components include a reactor core, an upper instrument structure or instrument tree which is located directly over the core in its normal operating position, a hoist arrangement (extending inside and outside the reactor vessel) and a fuel assembly track arrangement for transporting fuel assemblies into and out of the reactor vessel. These internal components as well as other components (both internally and externally) which have not been recited or shown may be conventional, and in any event, do not affect the present invention and, hence, will not be described herein.

As discussed in the recited co-pending application, it is periodically necessary to move the hoist arrangement for refueling the reactor core. This is accomplished by means of a conventional plug assembly 16 located at the top of the vessel in deck or cover 12. In the embodiment shown, this assembly includes three horizontally extending, circular plugs, an outermost plug 18 which is the largest of the three, an intermediate plug 20 which is eccentrically located entirely within plug 18 and an innermost plug 22 which is eccentrically located entirely within plug 20. All three plugs are mounted for rotation about their respective axes and, as a result, each includes its own surrounding annular clearance gap. More specifically, as seen in both FIGS. 1 and 2, an annular clearance gap 24 is provided around the outermost plug 18 between the latter and deck 12. An annular clearance gap 26 is provided around the intermediate plug between the latter and plug 18. Finally, an annular clearance gap 28 is provided around the innermost plug 22 between the latter and intermediate plug 20. In addition, nuclear reactor 10 includes a combination seal and bearing arrangement associated with each of the rotatable plugs, specifically an arrangement 30 associated with outermost plug 18, an arrangement 32 associated with intermediate plug 20 and an arrangement 34 associated with innermost plug 22. As will be seen hereinafter, each combination arrangement serves to seal the annular sealing gap surrounding its associated plug while, at the same time, providing a bearing system supporting the plug for rotation.

Turning now to FIG. 3, attention is specifically directed to the combination seal and bearing arrangement 30 associated with outer rotating plug 18 and surrounding clearance gap 24. As seen in FIG. 3 in conjunction with FIGS. 1 and 2 arrangement 30 includes an annular outer bearing race 36 fixedly mounted to deck 12 by suitable means such as a plurality of cooperating nuts and bolts, one pair of which is illustrated and generally indicated at 38. Race 36 includes a main body 40 which is annular in shape and which extends entirely around and just outside clearance gap 24, as best seen in FIG. 3. The interface between main body 40 and deck 12 is sealed by means of an O-ring 42 which is preferably constructed of metal and which also circumscribes deck 24 just outside the latter. Outer race 36 also includes an annular extension of main body 40 and located inwardly thereof. This extension which is generally indicated at 44 includes a horizontal base 46 spanning gap 24 just above the latter and two concentric, upstanding, annular flange walls 48 and 50 spaced inwardly of main body 40 and spaced from one another. Base 46 and annular flange wall 48, together with main body 40 define an annular channel 52 which opens upwardly. The outer wall 48 and annular flange 50 along with base 46 together define a second annular channel 54 which also opens upwardly and which is located concentrically inward of channel 52. The reason for each of these channels will be discussed hereinafter.

Overall seal and bearing arrangement 30 also includes an inner race 56 fixedly mounted to the outermost plug 18 for rotation therewith by suitable means such as a plurality of circumferentially spaced bolts and associated nuts, one pair of which is generally indicated at 58 in FIG. 3. This inner race includes a main body 60 which is annular in shape and which extends entirely around the outermost plug just inside its outer periphery and in close proximity to clearance gap 24, as best seen in FIG. 3. The interface between main body 60 and the outermost plug is sealed with an O-ring 62 similar to previously recited ring 42. Inner race 56 also includes a downwardly extending annular flange 64 supported by and spaced outwardly of main body 60. This downwardly depending flange includes a bottom end section 66 which is located concentrically within channel 52 in a spatial realtion to main body 40 and upstanding flange 48, as seen in FIG. 3.

It should be apparent from the foregoing that outer race 36 and inner race 56 together define what functionally may be considered a leakage path circumferentially between the two races from the clearance gap 24 outwardly to the ambient surroundings. This path which is generally indicated at 68 includes a first horizontal section between the confronting face of base 44 and the outermost edge of rotating plug 18, a second vertical section between the confronting faces of outer flange wall 50 of the outer race and main body 60 of the inner race, and a third section (both vertical and horizontal) between the downwardly depending flange 66 and those surfaces defining channel 52. Unless this path is sealed, it is capable of allowing the liquid metal coolant and cover gases within the reactor vessel to escape to the ambient surroundings while at the same time allowing oxygen and other ambient elements to enter the reactor. As will be seen hereinafter, this passage is sealed in accordance with the present invention.

In addition to the various components thus far described, arrangement 30 also includes a bearing system comprised of a plurality of ball bearings 70 located in cooperating pockets 72a and 72b which are located within the confronting faces of main body 40 of the outer race and downwardly depending flange 66 of the inner race and which are circumferentially spaced from one another in an outermost end section leakage path 68. The ball bearings, only one of which is illustrated, are provided for suspending the inner race and plug to which it is mounted for rotation about the axis of the latter.

In accordance with the present invention, previously described leakage passage 68 is sealed by means of a sealing and lubricating fluid 74, specifically, a liquid, provided within annular channel 52 and surrounding end section 66 of flange 64, thereby filling an entire circumferential section of the leakage path between clearance gap 24 and the ball bearings 70. In this way, the leakage path is sealed. However, at the same, the lubricant extends around and is provided for lubricating the ball bearings 70, as seen in FIG. 3. To this end, while fluid 74 may be of any suitable type which (1) functions in the manner intended, that is, as a sealant and a lubricant, and which (2) is compatible with its surrounding environment (but not necessarily the inner components within the reactor vessel), in a preferred embodiment this fluid is a silicone lubricating fluid such as Dow-Corning 710 silicone.

In the unlikely event that a seismic occurrence might cause fluid 74 within channel 52 to splash, the adjacent channel 54 is provided for capturing it rather than any fluid to pass down through the leakage path and into the clearance gap 24. In this regard, it should be noted that the inner flange wall 50 extends upward beyond the top edge of flange wall 48 and serves to deflect the splashed liquid into channel 54.

In order to fill channel 52 with sealing and lubricating fluid 74 and in order to replace this fluid periodically, outer race 36 includes at least one fill passage 80 extending through body 40 between bearing pocket 72a and the ambient surroundings and a drain passage 82 extending through the lower end of the body 40 between channel 52 (at its bottom) and the ambient surroundings. One or more drain passages 84 are also provided through the bottom of body 40 and base 46 between splash channel 54 and the ambient surroundings. While not shown, all of these passages include end caps for closing them when not in use.

From the foregoing, it should be apparent that overall arrangement 30 does not have to be disassembled in order to provide sealing and lubricating fluid 74 or for periodically replacing this fluid with new fluid. It should also be apparent that the fluid itself does not have to be compatible with the reactor coolant, and, in fact, in a preferred embodiment, it is not. Rather, as stated, in a preferred embodiment the fluid is a non-metallic one which serves not only as a seal but as a lubricant for the ball bearings 70, thereby eliminating the need for a separate lubricant or for a separate inflatable seal between the fluid sealant and the bearing system which was necessary in the past.

While, as just stated, it is not necessary to provide a seal between the combination sealing and lubricating fluid and the bearing system making up arrangement 30, it is nevertheless desirable to include a secondary seal outboard of the bearing system. This seal is only required during the periods of reactor operation (when the rotating plugs are stationary) to protect against reactor cover gas pressure surges. When the rotating plugs are moved, the seals are not necessary at all. Accordingly, an inflatable-deflatable seal constructed of any suitable material, e.g., elastomeric material as in the past, may be used. One such seal is shown in FIG. 3 and generally indicated by the reference numeral 86. This seal is annular in shape and extends entirely around adjacent inner race 56 just above outer race 36 and is supported in this position by an annular support ring 88 which also extends around the inner race and sits on top of the outer race. Support ring 88 is fixedly mounted to the outer race by suitable means such as a plurality of circumferentially spaced nuts and bolts, a pair of which is shown in FIG. 3 and generally indicated at 90. The interface between this support ring and the top surface of outer race 36 is sealed by means of an O-ring 92 similar to previously recited O-rings 42 and 62.

As seen best in FIG. 3, ring 88 supports annular seal 86 such that the latter is maintained in sealed engagement entirely around and against inner race 36 when the seal is inflated, thereby sealing the outboard end of leakage path 68 for preventing any of the fluid 74 from passing into the ambient surroundings during cover gas pressure surges. However, this seal is not necessary for protecting the bearing system when the rotating plugs are moved during refueling of the reactor because cover gas pressure surges will not be present. Therefore, the seal may be entirely deflated so as to disengage itself from inner race 56 and, thus, the seal is not subjected to the rotational movement of the inner race, thereby increasing its useful life.

From the foregoing description of combination seal and bearing arrangement 30, it should be apparent that the outer or fixed race could carry the downwardly depending flange part of the overall arrangement instead of the two channels and that the inner or rotating race could carry the two channels rather than the downwardly depending flange.

What is claimed is:

1. A combination seal and bearing arrangement for use in a nuclear reactor which includes a vertically extending vessel containing therein a number of components and a vessel cover located over the top of said vessel, said cover including first rotatable plug means which serves to perform certain position related functions on certain ones of said components and second means surrounding said plug means and, together with the latter, defining an annular opening therebetween, said combustion seal and bearing arrangement comprising:

stationary means fixedly mounted with said surrounding means and extending around the outside of said annular opening, rotating mean fixedly mounted with said plug means for rotation therewith and extending around the inside of said annular opening, said rotating means together with said stationary means defining a circumferential path which extends outwardly from said annular opening to the ambient surroundings;

bearing means located between and engaging said stationary and rotating means in said path; and a single sealing and lubricating liquid filling an entire circumferential section of said path between said bearing means and said annular opening for sealing said path from the influx of ambient elements at said section and, at the same time, for lubricating said bearing means.

2. An arrangement according to claim 1 wherein at least one of said stationary or rotating means includes passageway means extending between the ambient surroundings and said circumferential path section for filling said section with and draining said section of said sealing and lubricating liquid.

3. An arrangement according to claim 2 wherein said passageway means includes a passageway for filling said path section with said liquid and a separated passageway for draining said path section of said liquid.

4. An arrangement according to claim 1 including an inflatable and deflatable seal means supported by one of said stationary and rotating means and extending around a second circumferential section of said path between said bearing means and the ambient surroundings, said seal means engaging the other of said stationary and rotataing means when inflated for sealing said path at said section circumferential section and completely disengaging said other means when deflated.

5. An arrangement according to claim 4 wherein said one means supporting said inflatable and deflatable seal means includes separate disengagable means supporting said seal means whereby the latter can be readily replaced.

6. An arrangement according to claim 1 wherein one of said stationary and rotating means includes means defining an annular channel between said annular opening and said bearing means and opening upwardly, and wherein the other of said stationary and rotating means includes a main body and a downwardly extending annular flange supported by and spaced from said main body, said flange having a bottom end section which is located within said channel and which, together with the latter, define said circumferential path section, and wherein said sealing and lubricating liquid is a non-metallic liquid located within said channel around said flange end section.

7. An arrangement according to claim 6 wherein said one means defining said annular channel includes first and second passageways extending between said channel and the ambient surroundings for filling and draining said channel.

8. An arrangement according to claim 6 wherein said channel defining means defines a second upwardly opening annular channel in said leakage path and concentric with said first-mentioned channel between the latter and said annular opening, said second channel being provided for receiving any of said liquid which inadvertently splashes out of said first-mentioned channel in the direction of said annular opening, whereby to prevent said splashed liquid from reaching said opening.

9. An arrangement according to claim 8 wherein said one means defining said first-mentioned and second annular channels includes first and second passageways extending between said first-mentioned channel and the ambient surroundings for filling and draining said first-mentioned channel, respectively, and a third passageway extending between said second channel and the ambient surroundings for draining said second channel.

10. An arrangement according to claim 1 wherein one of said stationary and rotating means includes means defining an annular channel between said annular opening and said bearing means and opening upwardly, wherein the other of said stationary and rotating means includes a main body and a downwardly extending annular flange supported by and spaced from said main body, said flange having a bottom end section which is located within said channel and which, together with the latter, define said circumferential path section, wherein said sealing and lubricating liquid is a non-metallic liquid located within said channel around said flange end section, wherein said channel defining means defines a second upwardly opening annular channel in said path and concentric with said first-mentioned channel between the latter and said annular opening, said second channel being provided for receiving any of said liquid which inadvertently splashes out of said first-mentioned channel in the direction of said annular opening, whereby to prevent said splashed liquid from reaching said said opening, and wherein said one means defining said first-mentioned and second annular channels includes first and second passageways extending between said first-mentioned channel and the ambient surroundings for filling and draining said first-mentioned channel, respectively, and a third passageway extending between said second channel and the ambient surroundings for draining said second channel.

11. An arrangement according to claim 10 including an inflatable and deflatable seal means and separate disengagable means supporting said seal means to one of said stationary and rotating means and extending around a second circumferential section of said path between said bearing means and the ambient surroundings, said seal means engaging the other of said stationary and rotating means when inflated for sealing said path at said section circumferential section and completely disengaging said other means when deflated.

* * * * *